United States Patent
Rose (10) Patent No.: US 11,926,267 B2
(45) Date of Patent: Mar. 12, 2024

(54) CAMERA ARRANGEMENT, METHOD, DEVICE AND COMPUTER-READABLE STORAGE MEDIUM WITH INSTRUCTIONS FOR CONTROLLING AN ASSISTANCE SYSTEM

(71) Applicant: Volkswagen Aktiengesellschaft, Wolfsburg (DE)

(72) Inventor: Kai-Christen Rose, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 74 days.

(21) Appl. No.: 16/978,358

(22) PCT Filed: Feb. 7, 2019

(86) PCT No.: PCT/EP2019/052957
§ 371 (c)(1),
(2) Date: Sep. 4, 2020

(87) PCT Pub. No.: WO2019/170354
PCT Pub. Date: Sep. 12, 2019

(65) Prior Publication Data
US 2021/0001785 A1    Jan. 7, 2021

(30) Foreign Application Priority Data
Mar. 5, 2018    (DE) ...................... 10 2018 203 257.2

(51) Int. Cl.
*B60R 11/04*    (2006.01)
*B60W 40/08*    (2012.01)

(52) U.S. Cl.
CPC ............. *B60R 11/04* (2013.01); *B60W 40/08* (2013.01); *B60W 2040/0809* (2013.01)

(58) Field of Classification Search
CPC .......... B60R 11/04; B60W 2040/0809; B60W 40/08
See application file for complete search history.

(56) References Cited

U.S. PATENT DOCUMENTS

| 4,441,799 A | 4/1984 | Enomoto ..................... 396/90 |
| 6,525,653 B1 * | 2/2003 | Rigmaiden ........... B60R 25/102 180/287 |

(Continued)

FOREIGN PATENT DOCUMENTS

| DE | 3224661 A1 | 1/1983 | ............. G03B 11/04 |
| DE | 102005021672 A1 | 11/2006 | ............... B60R 1/00 |

(Continued)

OTHER PUBLICATIONS

German Office Action, Application No. 102018203257.2, 6 pages, dated Aug. 20, 2018.

(Continued)

*Primary Examiner* — Farzana Hossain
(74) *Attorney, Agent, or Firm* — Slayden Grubert Beard PLLC (57) ABSTRACT

A camera arrangement as well as a method, a device and a computer-readable storage medium with instructions for controlling an assistance system using the camera arrangement. The camera arrangement comprises a camera and an operating element for activating the camera and for deactivating the camera. The camera arrangement is suitable for reporting the activation of the camera and the deactivation of the camera via an interface to an external control unit.

17 Claims, 9 Drawing Sheets

(56) References Cited

U.S. PATENT DOCUMENTS

| | | | |
|---|---|---|---|
| 9,179,058 B1 | 11/2015 | Zeira et al. | |
| 9,834,143 B2 | 12/2017 | Zhang et al. | |
| 9,979,866 B2 | 5/2018 | Buss | |
| 2003/0142971 A1* | 7/2003 | Nishiwaki | G03B 15/03 |
| | | | 396/176 |
| 2004/0107028 A1* | 6/2004 | Catalano | B64D 45/0059 |
| | | | 701/2 |
| 2009/0002491 A1 | 1/2009 | Haler | 348/148 |
| 2010/0141762 A1* | 6/2010 | Siann | H04N 7/185 |
| | | | 348/372 |
| 2014/0347469 A1* | 11/2014 | Zhang | B60R 1/00 |
| | | | 348/118 |
| 2015/0163385 A1* | 6/2015 | Haddad | G03B 11/043 |
| | | | 348/374 |
| 2015/0235484 A1* | 8/2015 | Kraeling | G07C 5/0866 |
| | | | 701/1 |
| 2015/0350612 A1 | 12/2015 | Brunson et al. | 348/143 |
| 2016/0193971 A1* | 7/2016 | Yellambalase | B60R 1/00 |
| | | | 348/148 |
| 2017/0064161 A1* | 3/2017 | Buss | H04N 5/2252 |
| 2017/0108864 A1 | 4/2017 | Wiklinska et al. | 701/27 |
| 2017/0192428 A1* | 7/2017 | Vogt | G05D 1/0038 |
| 2019/0171004 A1 | 6/2019 | Bretagnol et al. | |

FOREIGN PATENT DOCUMENTS

| | | | | |
|---|---|---|---|---|
| DE | 102007033171 A1 | 1/2009 | | G07C 5/08 |
| DE | 102010005313 A1 | 8/2010 | | B60R 11/04 |
| DE | 102012004382 A1 | 11/2012 | | B60H 1/00 |
| DE | 102014107156 A1 | 11/2014 | | B60R 1/10 |
| DE | 102015003688 A1 | 9/2015 | | B60Q 1/04 |
| DE | 102015220237 A1 | 4/2017 | | B60K 28/06 |
| DE | 102016009508 A1 | 4/2017 | | B60R 25/102 |
| DE | 102017000029 A1 | 7/2017 | | B60R 1/00 |
| DE | 102018203257 A1 | 9/2019 | | B60R 1/00 |
| KR | 20050019292 A | 3/2005 | | H04B 1/38 |
| WO | 2015/120842 A1 | 8/2015 | | B60R 11/04 |
| WO | 2018/019459 A1 | 2/2018 | | G02B 27/00 |
| WO | 2019/170354 A1 | 9/2019 | | B60R 11/04 |

OTHER PUBLICATIONS

International Search Report and Written Opinion, Application No. PCT/EP2019/052957, 16 pages, dated Jun. 3, 2019.
Chinese Office Action, Application No. 201980017297.3, 11 pages, dated Feb. 25, 2023.

\* cited by examiner

CAMERA ARRANGEMENT, METHOD, DEVICE AND COMPUTER-READABLE STORAGE MEDIUM WITH INSTRUCTIONS FOR CONTROLLING AN ASSISTANCE SYSTEM

CROSS-REFERENCE TO RELATED APPLICATIONS

This application claims priority to German Patent Application No. DE 10 2018 203 257.2, filed on Mar. 5, 2018 with the German Patent and Trademark Office. The contents of the aforesaid Patent Application are incorporated herein for all purposes.

TECHNICAL FIELD

The present invention relates to a camera arrangement and to a method, a device and a computer-readable storage medium with instructions for controlling an assistance system using the camera arrangement. The invention further relates to a motor vehicle and an assistance service in which a method according to the invention or a device according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In today's motor vehicles, cameras for a wide variety of monitoring functions are already regularly installed, in particular for monitoring the environment of the vehicle.

SUMMARY

An object exists to provide solutions for camera surveillance of a user in which the user has certainty with regard to his privacy.

This object is solved by a camera arrangement, by a method, and by a device according to the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description. According to a first exemplary aspect, a camera arrangement with a camera and an operating element for activating the camera and for deactivating the camera is suitable for reporting the activation of the camera and the deactivation of the camera to an external control unit via an interface.

According to a further exemplary aspect, a method for controlling an assistance system comprises the steps of:
  detecting an activation or a deactivation of a camera of a camera arrangement; and
  granting an authorization for the assistance system in response to the activation of the camera or withdrawing an authorization for the assistance system in response to the deactivation of the camera.

According to a further exemplary aspect, a computer-readable storage medium contains instructions which, when executed by a computer, causes the computer to carry out the following steps for controlling an assistance system:
  detecting an activation or a deactivation of a camera of a camera arrangement; and
  granting an authorization for the assistance system in response to the activation of the camera or withdrawing an authorization for the assistance system in response to the deactivation of the camera.

Herein, the term computer should be understood broadly. In particular, it also includes control devices and other processor-based data processing devices.

According to a further exemplary aspect, a device for controlling an assistance system comprises a control unit, the control unit being suitable for detecting an activation or a deactivation of a camera of a camera arrangement and for granting an authorization for the assistance system in response to the activation of the camera or for withdrawing an authorization for the assistance system in response to the deactivation of the camera.

In the solution according to embodiments, the monitoring function of the camera is activated and deactivated by an operating element of the camera. This has the benefit of a simple, intuitively understandable solution. By activating the camera, the user clearly and unambiguously gives his consent to the monitoring and to the recording or transmission of the camera data. The camera arrangement is for example designed in such a manner that it is immediately evident for the user whether the camera is activated or deactivated. An authorization is granted or withdrawn to an assistance system depending on the status of activation of the camera.

In some embodiments, the operating element for activating the camera and for deactivating the camera comprises a cover element for a lens of the camera. In this case, an actuation of the cover element is detected in order to detect the activation or the deactivation of the camera. Alternatively, it may also be detected whether light hits a sensor of the camera. By covering the camera with the cover element, it is immediately evident for the user that the camera cannot be used for surveillance. Thus it is unquestionably ensured for the user that his privacy is preserved. As a result of being covered with the cover element, the camera is not necessarily completely switched off, but it is deactivated in the sense that it cannot take any pictures.

In some embodiments, the control element for activating the camera and for deactivating the camera comprises a switch, a slider, a cover, a rotary control, a lowering mechanism, a folding mechanism, a tilting mechanism or a sliding mechanism for the camera. To detect the activation or deactivation of the camera, an actuation of the switch, the slide, the cover, the rotary control, the lowering mechanism, the folding mechanism, the tilting mechanism or the sliding mechanism may be detected in this case. The desired privacy protection may be reliably achieved through each of the listed implementations of the control element. Accordingly, the implementations differ in terms of optics, appearance and costs, such that a suitable implementation may be selected depending on the permissible costs of parts, the design of the usage environment and the target group addressed. In the case of the folding mechanism, the tilting mechanism and the shifting mechanism, the camera may be folded, tilted or shifted for activation so that it may record the desired people in the end position. For deactivation, the camera is accordingly folded, tilted or shifted in such a way that in the end position it may no longer record these people.

In some embodiments, the rotary control is set up to open and close a diaphragm of the camera, for example an iris diaphragm, or to open and close at least one electrical contact of the camera. The rotary control may, e.g. enclose an objective lens of the camera. In particular in vehicles, the rotary control may be widely used as a control element. It is therefore well established for the intuitive operation of a system. In addition, a high-quality feel and elegance may be achieved using a rotary control.

It is highly beneficial to use a method according to the present disclosure or a device according to the present disclosure in a vehicle, for example in a motor vehicle. In this case, the camera arrangement is for example used to monitor an interior space of the motor vehicle. This is especially beneficial if the assistance system is used for autonomous or partially autonomous driving of the motor vehicle. The monitoring of the interior space may be used to check whether the driver is ready to take over driving. The monitoring of the interior space is also beneficial if the assistance system is used for occupant safety or occupant care. For example, within car sharing for quasi-public passenger transport, monitoring may take place for security reasons if the vehicle is used by several people who are unknown to one another. In the case of a purely private booking by a person or a group belonging together, however, the camera may be visibly deactivated. The activation of the camera may also be used to establish a connection to an operator, for example for emergency care or to use a concierge service. A concierge service may also be completely automated, i.e., provided by an AI system (AI: Artificial Intelligence). For that matter, a video transmission may also be useful, e.g. for documentation, for analyzing behavior by recognizing emotions or non-verbal communication, etc. A video call may also be initiated by activating the camera. For example for emergency care it may be useful if, in the event of an emergency being recognized, authorized access may take place from outside, which activates the camera. In this case, the activation of the camera is visible to the people in the interior, for example by opening an iris diaphragm.

A method according to the present disclosure or a device according to the present disclosure may also be used in an assistance service, for example in a personal intelligent assistant in the household, in an assistance facility in public space or in the context of an interaction with an operator in some embodiments.

Further features of the present disclosure will become apparent from the following description and the appended claims in conjunction with the FIGS.

For a better understanding of the principles of the present invention, embodiments of the present disclosure are explained in more detail in the following with reference to the FIGS. It should be understood that the invention is not restricted or limited to these embodiments and that the features described may also be combined or modified without departing from the scope of the invention as defined in the appended claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
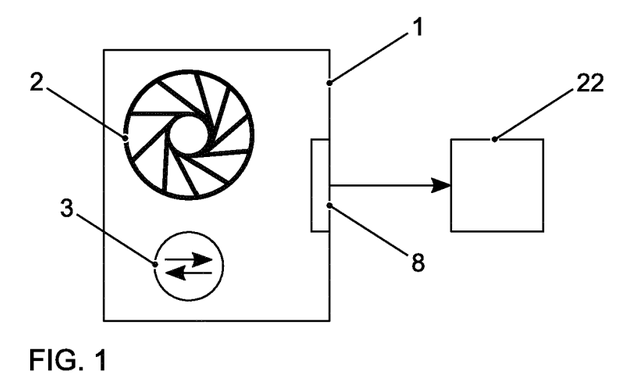
FIG. 1 shows an exemplary camera arrangement with a camera and an operating element.

FIG. 1 shows, very schematically, a camera arrangement 1 with a camera 2 and an operating element 3. By means of the camera arrangement 1, for example a monitoring of an interior of a motor vehicle may be carried out. The camera 2 may be activated and deactivated by means of the control element 3. Among other things, the operating element 3 may comprise a cover element for a lens of the camera 2 or close and open an electrical contact of the camera 2. For example, the operating element 3 may comprise a switch, a slide, a cover, a rotary control, a lowering mechanism, a folding mechanism, a tilting mechanism or a displacement mechanism for the camera 2. In the case of a rotary control, this may be suitable for opening and closing a diaphragm of the camera 2. For this purpose, the rotary control for example encloses an objective lens of the camera 2. The activation of the camera 2 and the deactivation of the camera 2 may be reported to an external control unit 22 via an interface 8 of the camera arrangement 1.

Figure 2:
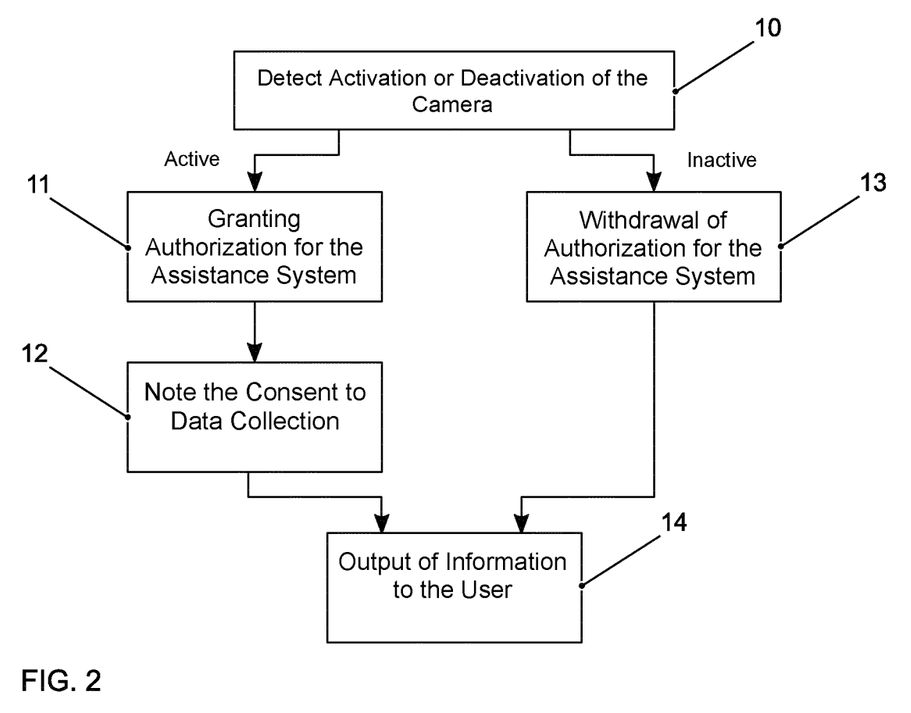
FIG. 2 shows schematically an exemplary method for controlling an assistance system.

FIG. 2 schematically shows a method for controlling an assistance system. In a first step, an activation or a deactivation of a camera of a camera arrangement is detected 10. For this purpose, for example an actuation of a cover element for a lens of the camera or an actuation of a switch, a slide, a lid, a rotary control, a lowering mechanism, a folding mechanism, a tilting mechanism or a sliding mechanism for the camera may be detected. In response to activation, an authorization for the assistance system is issued 11. In addition, consent to data acquisition is noted 12, in order to be able to prove this later if necessary. In response to a deactivation, however, the authorization for the assistance system is withdrawn 13. In both cases, the user is informed about the current status of the authorization by outputting information 14. For example, the assistance system may be used for autonomous or partially autonomous driving of a motor vehicle, for occupant safety or for occupant care. In this case, for example a monitoring of an interior space of the motor vehicle may be performed by means of the camera arrangement. When the authorization is granted, the assistance system does not necessarily take over its assistance function immediately. It also may only be made ready to take over its assistance function at a later point in time, for example at the express request of the user.

Figure 3:
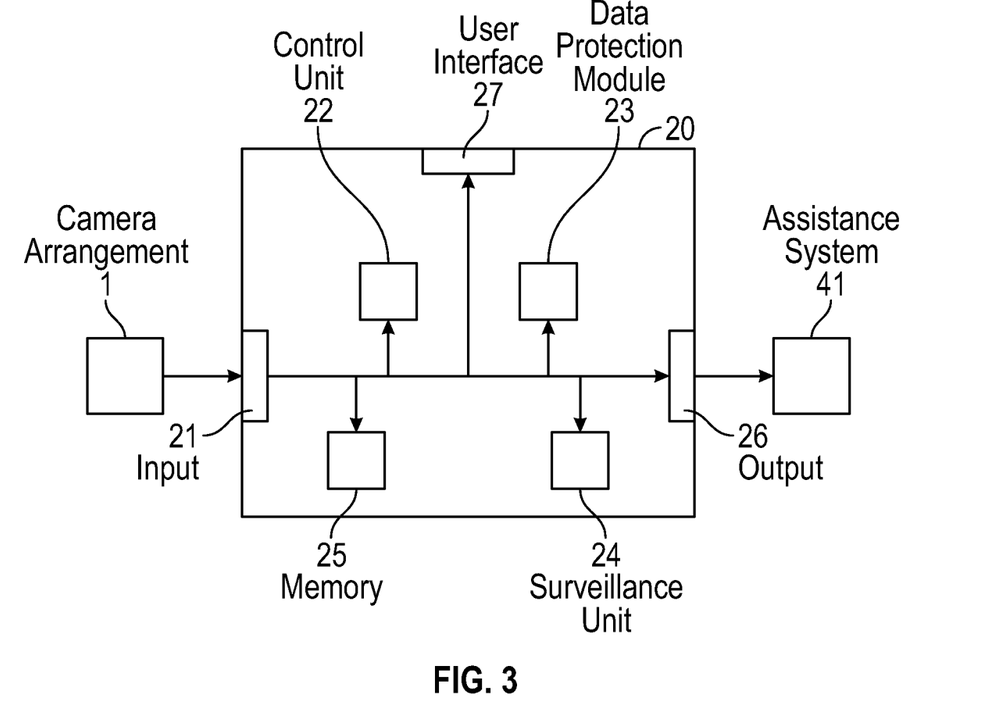
FIG. 3 shows a first embodiment of a device for controlling an assistance system.

FIG. 3 shows a simplified schematic representation of a first embodiment of a device 20 for controlling an assistance system 41. The device 20 has an input 21 via which a signal from a camera arrangement 1 may be received. The device 20 also has a control unit 22 for detecting activation or deactivation of a camera of the camera arrangement 1. For this purpose, for example, actuation of a cover element for a lens of a camera or actuation of a switch, a slide, a cover, a rotary control, a lowering mechanism, a folding mechanism, a tilting mechanism or a sliding mechanism for the camera may be detected. The control unit 22 is suitable for issuing an authorization for the assistance system 41 in response to the activation of the camera and for withdrawing an authorization for the assistance system 41 in response to the deactivation of the camera. In response to the activation of the camera, a data protection module 23 also generates a note about the consent of the user to the data acquisition. Control signals from the control unit 22 may be output to the assistance system 41 via an output 26 of the device 20. In addition, the data protection module 23 may provide information via the output 26. The assistance system 41 for example may be used for autonomous or semi-autonomous driving of a motor vehicle, for occupant safety or for occupant care. In this case, by means of the camera arrangement 1 for example a monitoring of an interior space of the motor vehicle may take place.

The control unit 22 and the data protection module 23 may be controlled by a surveillance unit 24. If necessary, settings of the control unit 22, the data protection module 23 or the surveillance unit 24 may be changed via a user interface 27. If necessary, the data obtained in the device 20 may be stored in a memory 25 of the device 20, for example for later evaluation or for use by the components of the device 20. The control unit 22, the data protection module 23 and the surveillance unit 24 may be implemented as dedicated hardware, for example as integrated circuits. Of course, they may also be partially or completely combined or be implemented as software that runs on a suitable processor, for example on a CPU or GPU. The input 21 and the output 26 may be implemented as separate interfaces or as a combined bidirectional interface.

Figure 4:
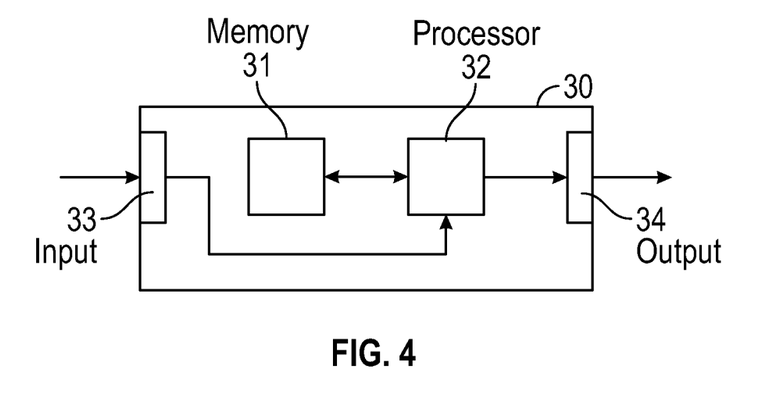
FIG. 4 shows a second embodiment of a device for controlling an assistance system.

FIG. 4 shows a simplified schematic illustration of a second embodiment of a device 30 for controlling an assistance system. The device 30 has a processor 32 and a memory 31. For example, the device 30 is a computer or a control device. Instructions are stored in memory 31 which, when executed by processor 32, cause device 30 to carry out the steps according to one of the described methods. The instructions stored in the memory 31 thus embody a program which may be executed by the processor 32 and which implements the method according to some embodiments. The device 30 has an input 33 for receiving information, in particular a signal from a camera arrangement according some embodiments. Data generated by the processor 32 are provided via an output 34. In addition, they may be stored in memory 31. The input 33 and the output 34 may be combined to form a bidirectional interface.

The processor 32 may include one or more processing units, such as microprocessors, digital signal processors, or combinations thereof.

The memories 25, 31 of the described embodiments may comprise both volatile and non-volatile storage areas and include a wide variety of storage devices and storage media, for example hard disks, optical storage media or semiconductor memories.

Figure 5:
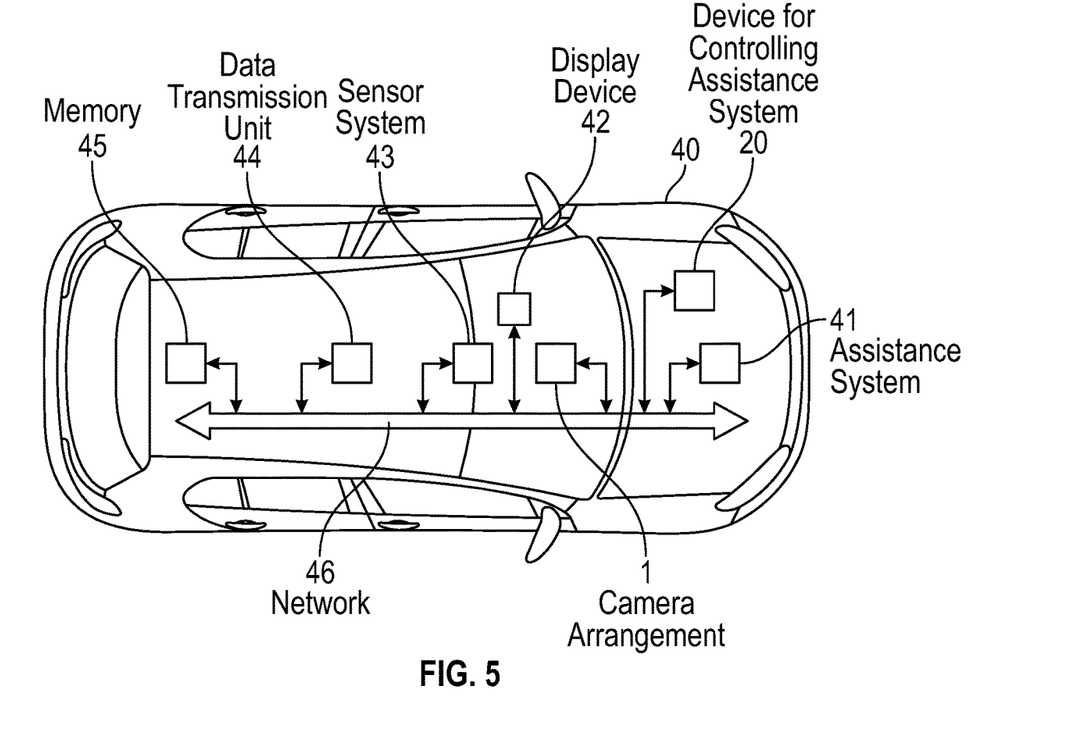
FIG. 5 shows schematically a motor vehicle in which a solution according to an embodiment is implemented.

FIG. 5 schematically shows a motor vehicle 40 in which a solution according to some embodiments is implemented. The motor vehicle 40 comprises an assistance system 41, for example for autonomous or partially autonomous driving, for occupant safety or for occupant care. Furthermore, the motor vehicle 40 comprises a camera arrangement 1 for monitoring the interior space and a device 20 for controlling the assistance system 41. By means of a display device 42 the driver may be informed, among other things, about the authorization of the assistance system 41. Further components of the motor vehicle 40 are a sensor system 43 for recording the surroundings and a data transmission unit 44. A connection to service providers may be established by means of the data transmission unit 44, for example to transmit the user's consent to data acquisition. A memory 45 is provided for storing data. The data exchange between the various components of the motor vehicle 40 takes place via a network 46.

Figure 6:
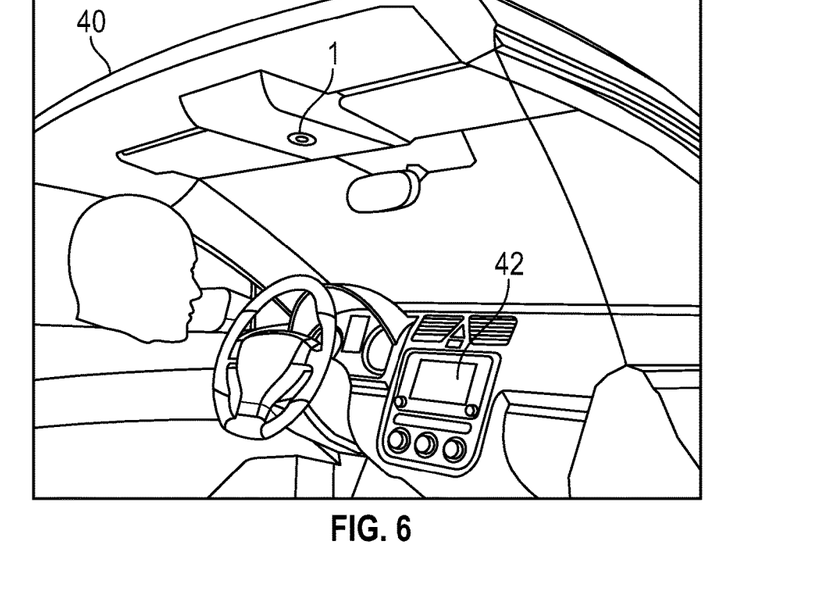
FIG. 6 shows an exemplary interior of a motor vehicle with a camera arrangement.

FIG. 6 shows schematically the interior space of a motor vehicle in which a solution according to some embodiments is implemented. In this example, a camera arrangement for monitoring the interior space is arranged in a roof console of the motor vehicle 40. However, it may also be installed in other positions, for example in a dashboard, in the review mirror or in the headliner. A display device 42 is built into the center console, for example in the form of a touch display. It is also possible to integrate the display device 42 into the instrument cluster or to implement it as a head-up display.

Some further embodiments are explained below with reference to FIGS. 7 to 12. In all FIGS., the camera is not activated in the partial image a), but activated in the partial image b).

Figure 7:
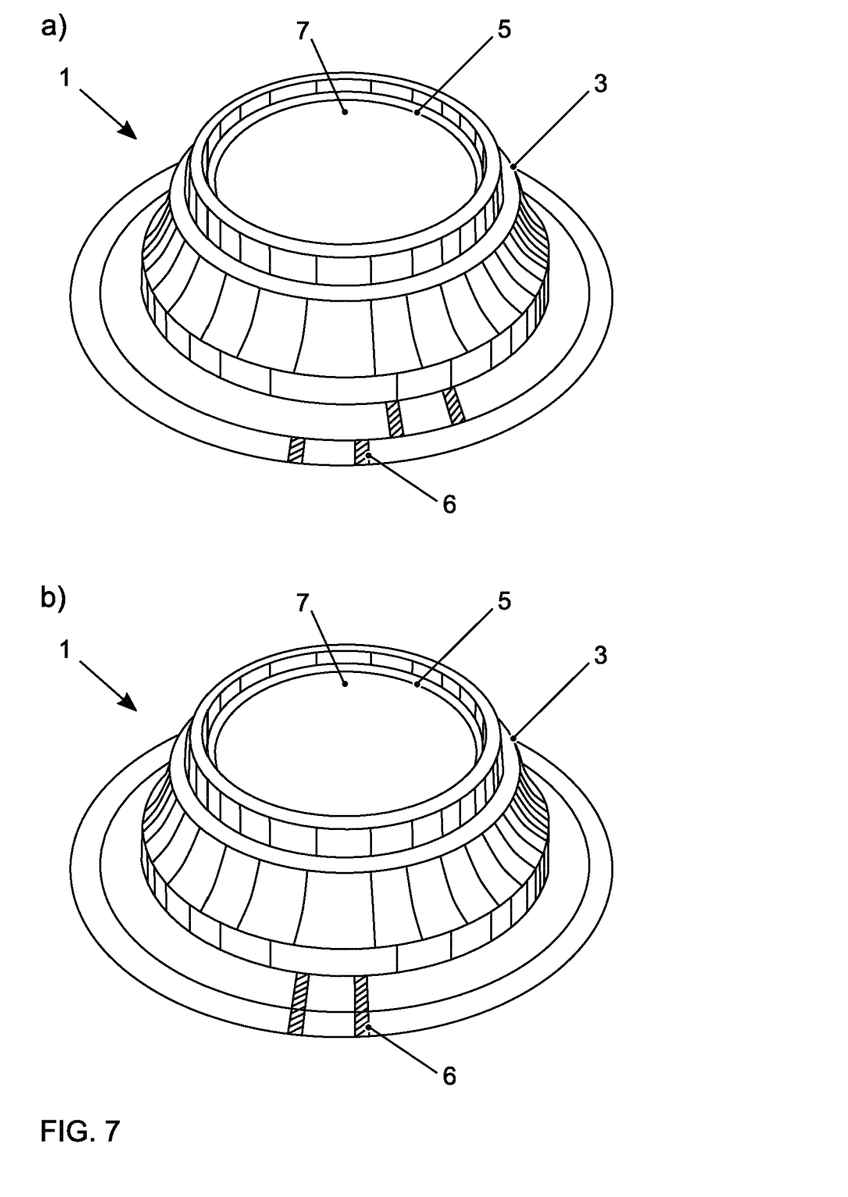
FIG. 7 shows a first example of a camera arrangement.

FIG. 7 shows a first example of a camera arrangement 1. In this example, the operating element 3 is designed as a rotary control, which is arranged around an objective 5 of the camera with an objective lens 7. The camera located in the rotary control is hard-wired and is switched on and off by turning it, that means that the rotary control is designed in such a manner that electrical contacts 6 are opened or closed by turning. When the electrical contacts 6 are open, the camera is deactivated. By turning the rotary control, the electrical contacts 6 are closed and the camera is activated. The rotary control may be knurled for improved haptics.

Figure 8:
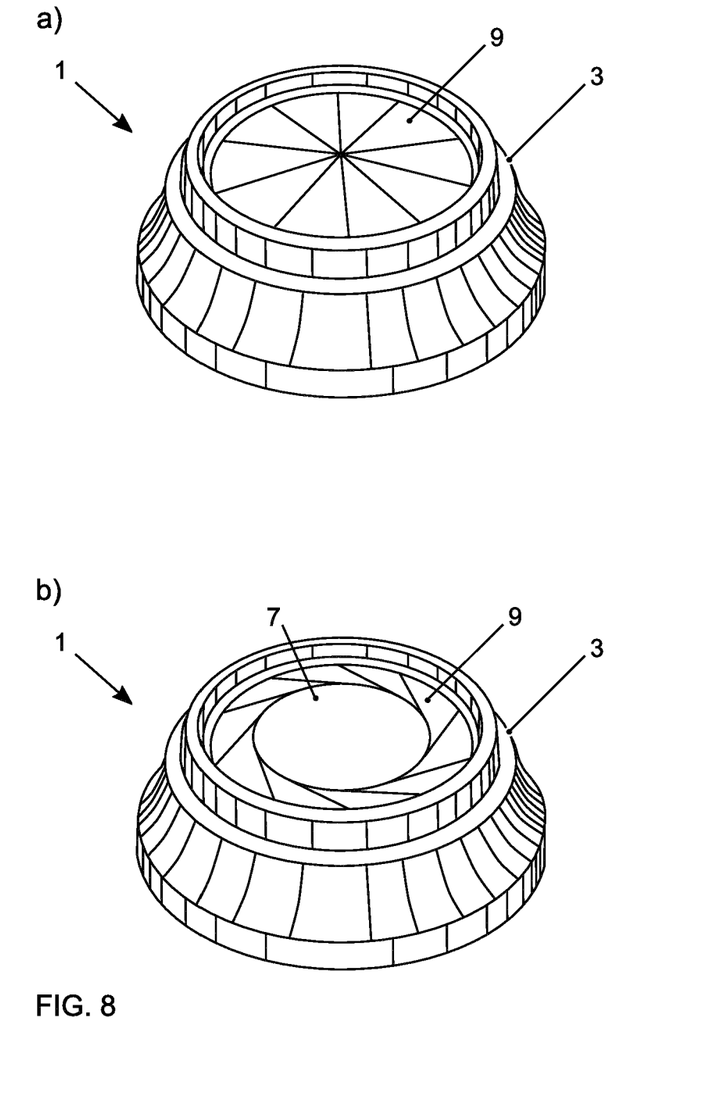
FIG. 8 shows a second example of a camera arrangement.

FIG. 8 shows a second example of a camera arrangement 1. In this example the operating element 3 is also designed as a rotary control, which is arranged around the objective 5 of the camera with the objective lens 7. The rotary control is designed in such a way that an iris diaphragm 9 or a similar suitable cover is opened or closed by rotation. When the iris diaphragm 9 is closed, the camera is deactivated. By turning the rotary control, the iris diaphragm 9 is opened and the camera is activated. The opening of the iris diaphragm 9 may be detected, for example, via electrical contacts (not shown) in the rotary control. Alternatively, it may also be detected that light hits a sensor of the camera. As before, the rotary control may be knurled.

Figure 9:
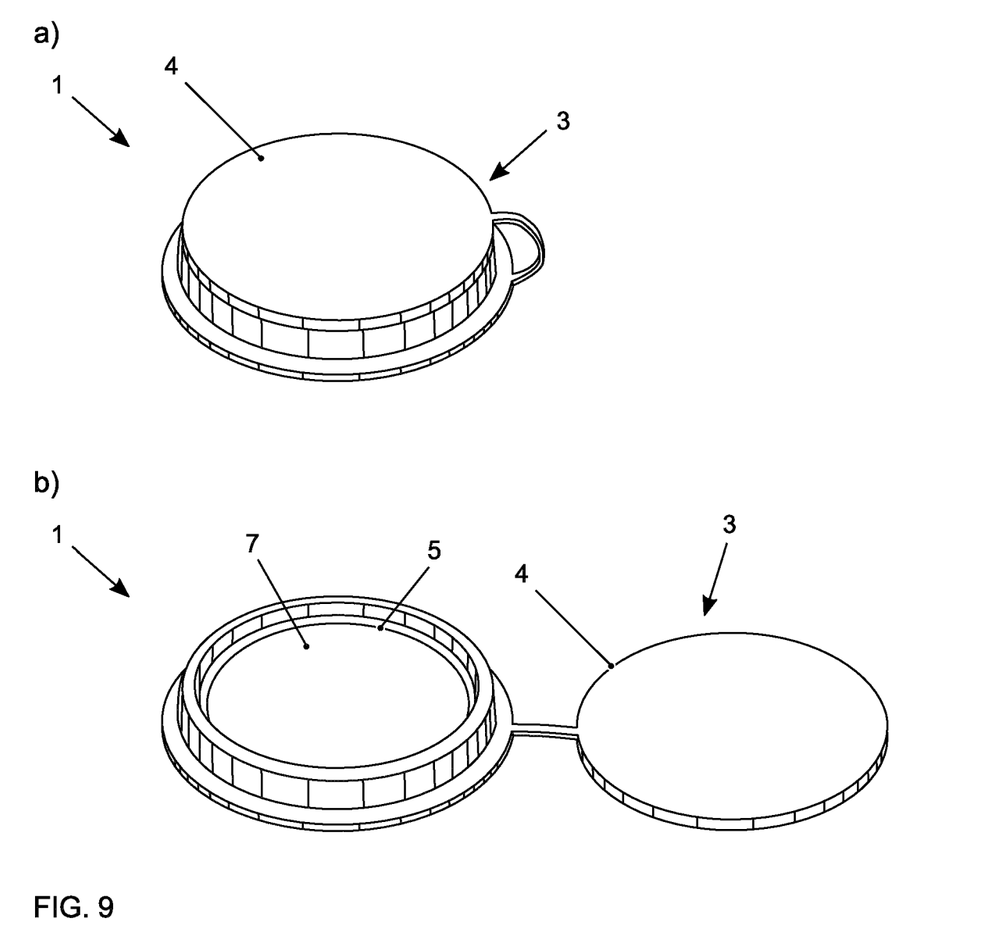
FIG. 9 shows a third example of a camera arrangement.

FIG. 9 shows a third example of a camera arrangement 1. In this example, the operating element 3 is designed as a cover element 4, here specifically as a cover that may not be lost. The cover is designed in such a way that it may cover the objective 5 of the camera with the objective lens 7. For example the cover snaps into a rim of the lens 5, e.g. magnetically or mechanically. The camera is deactivated when the cover is closed. The camera is activated by removing the cover. The removal of the cover may be detected, for example, via electrical contacts (not shown) in the frame of the lens 5. Alternatively, it may again be detected that light hits the sensor of the camera.

Figure 10:
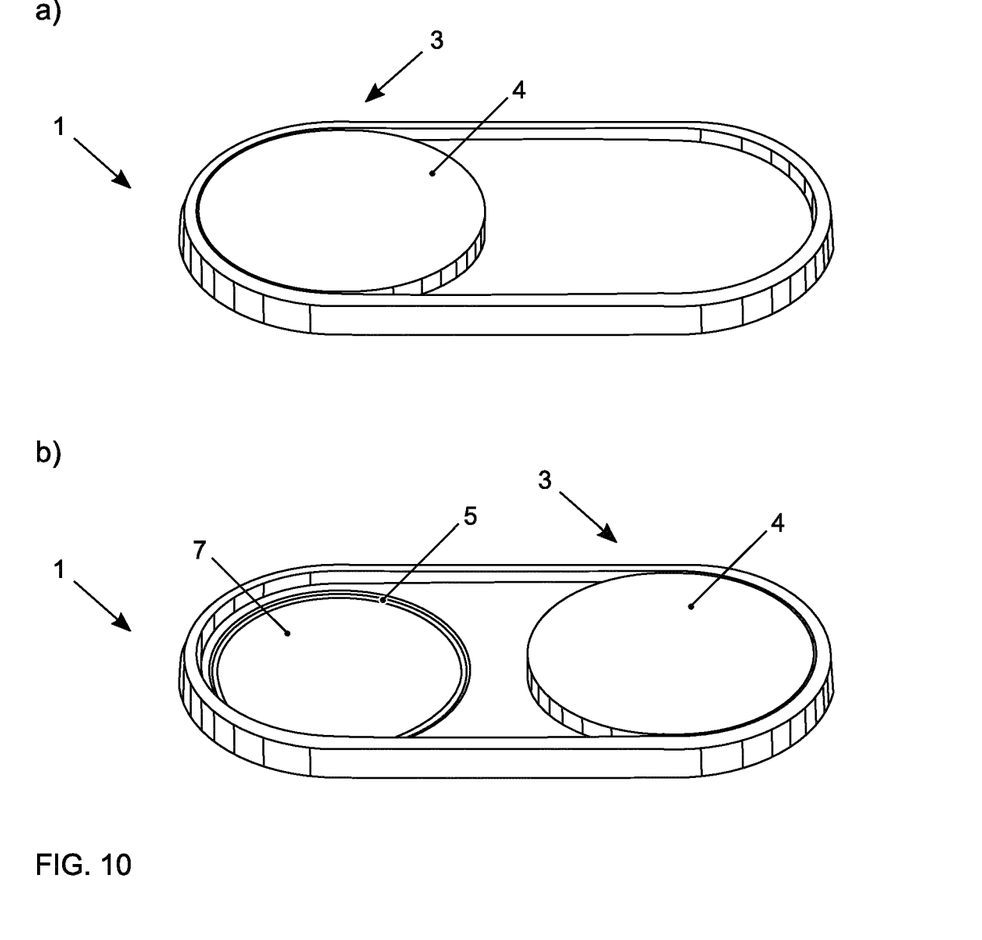
FIG. 10 shows a fourth example of a camera arrangement.

FIG. 10 shows a fourth example of a camera arrangement 1. In this example, the operating element 3 is designed as a cover element 4, here specifically as a slide. In a first position, the slide covers the objective lens 7 of the objective 5 of the camera. The camera is deactivated in this position of the slider. By moving the slide to a second position, the objective lens 7 is uncovered and the camera is activated. The displacement of the slide may be detected, for example, via electrical contacts (not shown) in an enclosure of the slide. As before, in this embodiment it may also be detected that light hits the sensor of the camera.

Figure 11:
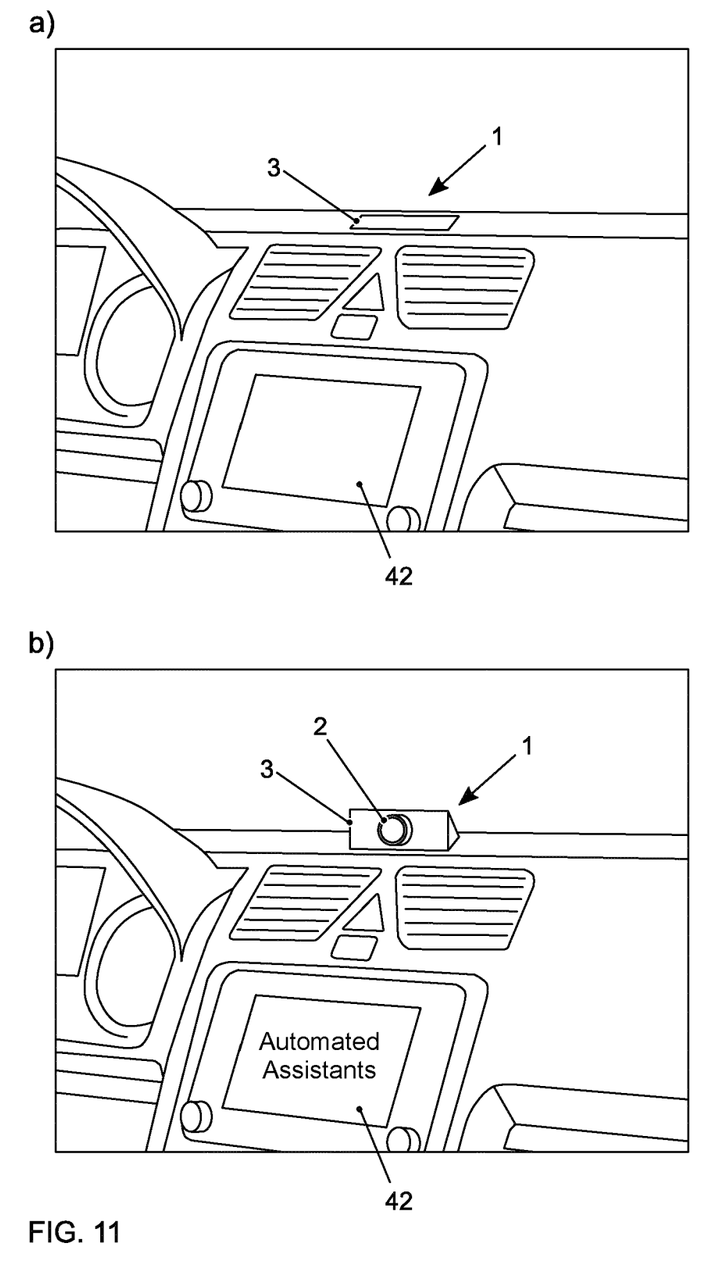
FIG. 11 shows a fifth example of a camera arrangement.

FIG. 11 shows a fifth example of a camera arrangement 1. In this example, the camera arrangement 1 is arranged in an instrument panel and is operated by means of a retractable mechanism. A cover of the camera arrangement 1 serves as the operating element 3 here. When the camera arrangement 1 is sunk into the dashboard, the camera 2 of the camera arrangement 1 cannot record any images. The camera 2 is therefore deactivated. By pressing the cover of the camera arrangement 1, the camera arrangement 1 is extended or folded out of the dashboard. The camera 2 may now take pictures and is therefore active. A corresponding reference to the authorization of an assistance system appears on a display device 42. The extension or unfolding of the camera arrangement 1 may be detected via electrical contacts (not shown) in the lowering mechanism or via an image captured by the camera 2.

Figure 12:
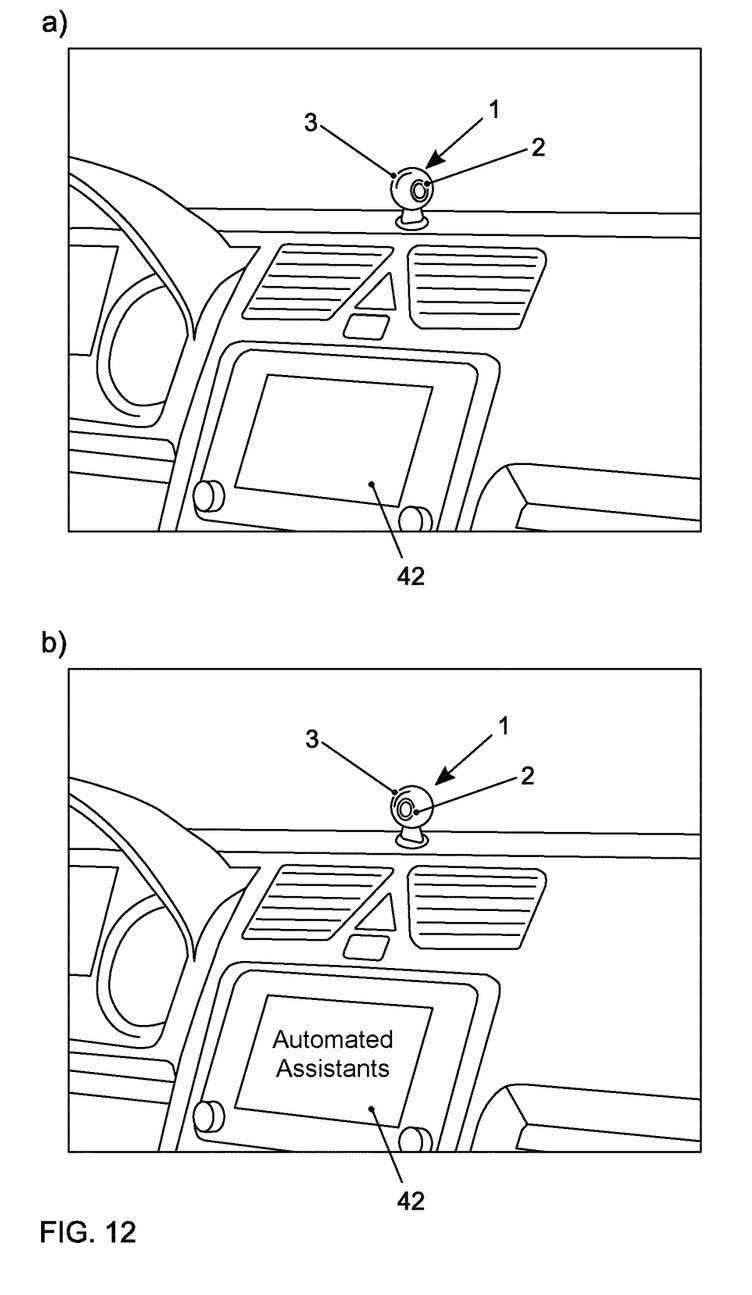
FIG. 12 shows a sixth example of a camera arrangement.

FIG. 12 shows a sixth example of a camera arrangement 1. In this example, the camera arrangement 1 is rotatably arranged on an instrument panel. A housing of the camera arrangement 1 serves here as the operating element 3. In a first position, the camera 2 is not directed at the driver, therefore it cannot detect the driver and is therefore deactivated. By rotating the housing into a second position, the camera 2 is aligned with the driver. The camera 2 may now detect the driver and is therefore active. A corresponding reference to the authorization of an assistance system appears on a display device 42. The rotation of the housing may be detected via electrical contacts (not shown) in the housing.

LIST OF REFERENCE NUMERALS 1 camera arrangement
2 camera
3 control element
4 cover element
5 lens
6 electrical contact
7 objective lens
8 interface
9 iris diaphragm
10 detecting activation or deactivation of the camera
11 authorization for the assistance system
12 noting consent to data collection
13 revoking an authorization for the assistance system
14 output of information to the user
20 device
21 entrance
22 control unit
23 data protection module
24 surveillance unit
25 memory
26 exit
27 user interface
30 device
31 memory
32 processor
33 input
34 exit
40 motor vehicle
41 assistance system
42 display device
43 sensors
44 data transmission unit
45 memory
46 network The invention has been described in the preceding using various exemplary embodiments. Other variations to the disclosed embodiments can may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A system for a vehicle, the system comprising:
at least one camera for monitoring an interior space of the vehicle;
an operating element for the camera, the operating element controllable by an occupant in the interior space of the vehicle to select between a first position and a second position, wherein in the first position of the operating element, the camera is activated and in the second position of the operating element, the camera is deactivated;
wherein when activated, the camera is arranged so that the interior space is in a field of view of the camera and when deactivated, the camera is arranged so that the interior space is not in the field of view; and
a control unit, connected with the operating element and a driver assistance system of the vehicle, the control unit being configured for, during driving of the vehicle:
monitoring a position of the operating element;
if the operating element is moved to the first position, issuing a monitoring authorization for the driver assistance system to monitor the interior space using the camera; and
if the operating element is moved to the second position, withdrawing the monitoring authorization.

2. The system of claim 1, comprising a data protection circuit, connected with the control unit, the data protection circuit being configured note consent of the occupant to data acquisition when the camera being activated.

3. The system of claim 1, wherein in case the monitoring authorization for the driver assistance system is issued, the occupant is informed about the monitoring authorization.

4. The system of claim 1, wherein the at least one camera comprises a lens and the operating element for activating the at least one camera and for deactivating the at least one camera has a cover element for the lens.

5. The system of claim 1, wherein the operating element comprises one or more of a switch, a slide, a cover, a rotary control, a lowering mechanism, a folding mechanism, a tilting mechanism, and a sliding mechanism for the at least one camera.

6. The system of claim 1, wherein the operating element comprises a rotary control, wherein the rotary control is configured for opening and closing a diaphragm of the at least one camera or for opening and closing at least one electrical contact of the at least one camera.

7. The system of claim 1, wherein the vehicle is an autonomous or partially autonomous vehicle, and the at least one camera allows monitoring of the interior space of the vehicle to determine, whether a driver of the vehicle is ready to take over driving.

8. The method of claim 6, wherein the vehicle is an autonomous or partially autonomous vehicle, and the at least one camera system allows monitoring of the interior space of the vehicle to determine, whether a driver of the vehicle is ready to take over driving.

9. The system of claim 1, wherein the at least one camera comprises a lens and the operating element comprises a rotary control, wherein the rotary control encloses the lens.

10. The system of claim 6, wherein the rotary control encloses an objective lens of the at least one camera.

11. A method for a vehicle, comprising:
detecting, during driving of the vehicle, whether an operating element of at least one camera for monitoring an interior space of the vehicle is in a first position or in a second position, the operating element controllable by an occupant in the interior space of the vehicle from the first position to the second position and from the second position to the first position;
wherein in the first position, the at least one camera is activated and in the second position, the at least one camera is deactivated;
wherein when activated, the camera is arranged so that the interior space is in a field of view of the camera and when deactivated, the camera is arranged so that the interior space is not in the field of view;
determining from the operating element, whether the at least one camera is activated or deactivated;
in response to the at least one camera being activated, issuing a monitoring authorization for a driver assistance system to monitor the interior space; and
in response to the at least one camera being deactivated, withdrawing the monitoring authorization for the driver assistance system to monitor the interior space.

12. The method of claim 11, wherein for detecting the activating or deactivating of the at least one camera an actuation of one or more of a switch, a slide, a lid, a rotary control, a lowering mechanism, a folding mechanism, a tilting mechanism, and a sliding mechanism for the at least one camera is recorded.

13. The method of claim 11, wherein for detecting the activating or the deactivating of the at least one camera, an actuation of a cover element for a lens of the at least one camera is detected.

14. The method of claim 11, wherein the driver assistance system is used for one or more of autonomous or partially autonomous driving of the vehicle, for occupant safety, and for occupant care.

15. A non-transitory computer-readable storage medium with instructions which, when executed by a computer or microprocessor, cause the computer or microprocessor to carry out the method of claim 11.

16. A motor vehicle comprising:
at least one driver assistance system;
at least one camera for monitoring an interior space of the motor vehicle;
an operating element for the camera, the operating element controllable by an occupant in the interior space of the motor vehicle to select between a first position to a second position;
wherein in the first position of the operating element, the camera is activated and in the second position of the operating element, the camera is deactivated;
wherein when activated, the camera is arranged so that the interior space is in a field of view of the camera and when deactivated, the camera is arranged so that the interior space is not in the field of view; and
a control unit, connected with the operating element and the driver assistance system, the control unit being configured for, during driving of the motor vehicle:
monitoring the operating element;
if the operating element moves to the first position, issuing a monitoring authorization for the driver assistance system to monitor the interior space; and
if the operating element moves to the second position, withdrawing the monitoring authorization.

17. The motor vehicle of claim 16, wherein the motor vehicle is an autonomous or partially autonomous vehicle, and the at least one camera system allows monitoring of the interior space of the vehicle to determine, whether a driver of the vehicle is ready to take over driving.

* * * * *